Sept. 21, 1937.  R. B. HUYETT  2,093,446
ABRASIVE SEPARATING AND CLEANING APPARATUS
Filed Aug. 21, 1934  3 Sheets-Sheet 1
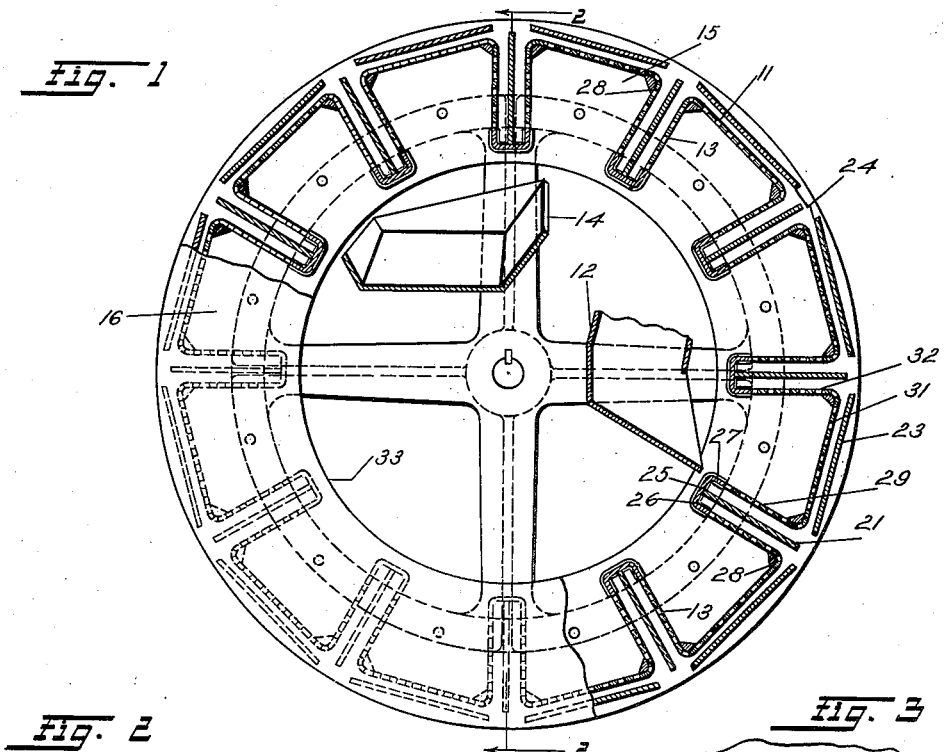
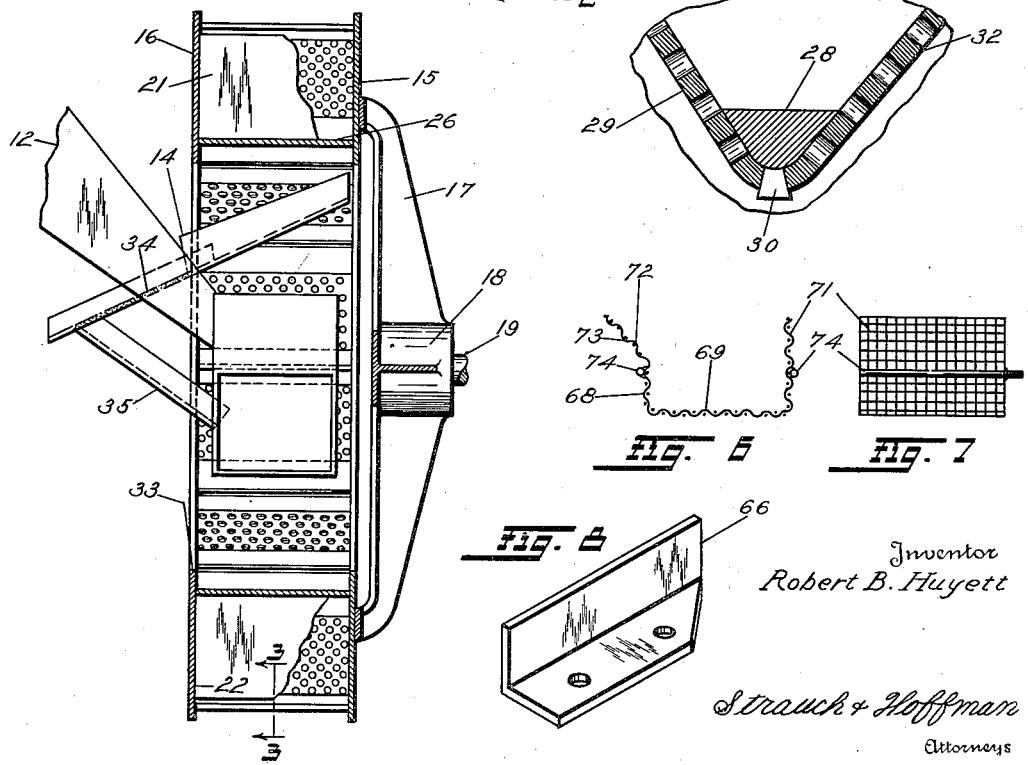
Inventor
Robert B. Huyett
Strauch & Hoffman
Attorneys Sept. 21, 1937.   R. B. HUYETT   2,093,446
ABRASIVE SEPARATING AND CLEANING APPARATUS
Filed Aug. 21, 1934   3 Sheets-Sheet 2

Inventor
Robert B. Huyett
By
Strauch & Hoffman
Attorneys

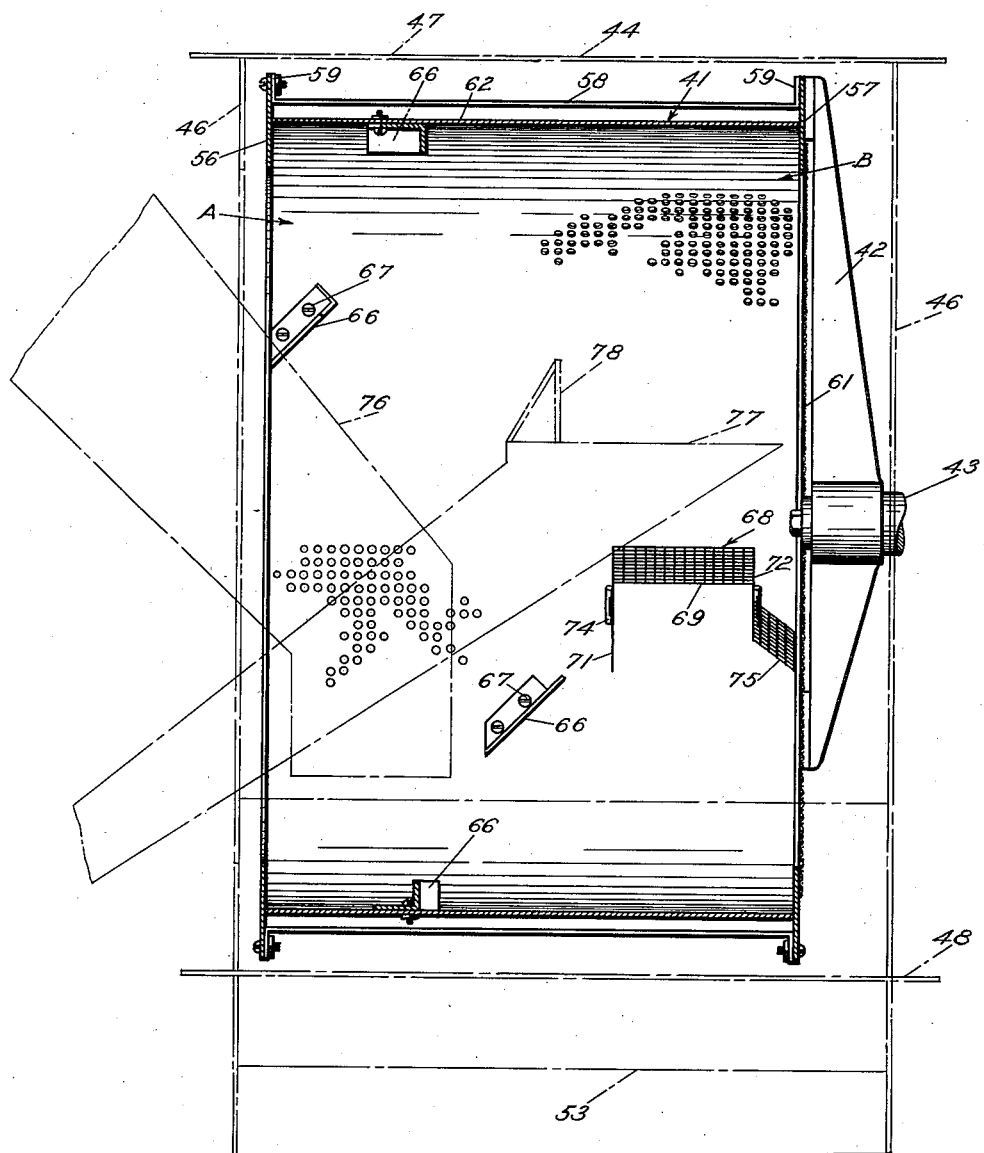

Patented Sept. 21, 1937

2,093,446

UNITED STATES PATENT OFFICE 2,093,446

ABRASIVE SEPARATING AND CLEANING APPARATUS

Robert B. Huyett, Hagerstown, Md., assignor to Pangborn Corporation, Hagerstown, Md., a corporation of Maryland Application August 21, 1934, Serial No. 740,825

10 Claims. (Cl. 209—294)

This invention relates to apparatus for cleaning abrasive and separating particles of foreign matter and refuse therefrom and more particularly, to an apparatus for reclaiming and cleaning abrasive which has been used in sand blasting as in connection with the cleaning of castings and like operations.

Abrasive material as usually employed in connection with sand blasting or similar operations is in the form of hard metal granules, though sand, grit, or shot or similar materials of granular character may be employed. In blasting, the abrasive is projected at high speed against the surface of the article to be cleaned, as by means of compressed air and after use, is found to be mixed with debris and foreign matter such as nails, wire, slugs, foundry sand, core sand, fine dust and the like.

The present invention in reclaiming used abrasive or preparing new abrasive or the like for use has as its principal object the provision of novel apparatus for the separation of abrasive from undesirable foreign matter after which the abrasive may be cleaned according to the methods and apparatus disclosed in my copending application Serial No. 454,780 filed on May 22, 1930 of which the present application is in part a continuation.

A further object of my invention is the provision of novel apparatus whereby nails, wire slugs and particles of material of larger size than the desired abrasive granules can be readily and efficiently separated from the abrasive with immediate removal of such refuse and no consequent clogging of the separating means.

Still a further object of my invention is the provision of novel screening means wherein material to be screened is quickly passed therethrough and refuse and debris separated therefrom immediately removed to avoid a piling-up of the latter with a consequent clogging of the screening means and contact of the refuse with newly entering material.

A further object of my invention is to provide novel separating means for the removal of foreign particles such as wire, slugs, nails and the like from material to be reclaimed wherein such particles are positively prevented from passing through the screening means and are immediately discharged therefrom.

A more specific object of my invention resides in the provision of a novel arrangement of perforate and imperforate sections in a screening apparatus whereby foreign material is quickly removed from the material being screened and as readily removed from the screening apparatus.

A further object of my invention is to provide novel separating apparatus wherein the material to be treated is introduced in one section thereof and the major portion of material removed therefrom, the balance being agitated, conveyed to a second section wherein refuse such as wire, slugs, nails and the like are removed therefrom and discharged from the apparatus without contact with newly entering material.

Other objects and advantages of my invention will become apparent as the description thereof proceeds, taken in connection with the accompanying drawings wherein:

Figure 1 is a side elevation of a preferred embodiment of the screening apparatus of the present invention looking in the direction of the axis, a portion of the side wall being broken away to show the internal construction.

Figure 2 is a section on the line 2—2 of Figure 1 of a diagrammatic nature in that the chutes on both sides of the sections are shown.

Figure 3 is a detail view of one of the screen corners taken as a section on the line 3—3 of Figure 2.

Figure 5 is a section on the line 5—5 of Figure 4 with the chutes shown to illustrate their relation to the screening member.

Figure 6 is an end view of a refuse bucket employed in connection with the embodiment of my invention illustrated in Figures 4 and 5.

Figure 7 is a side view of the refuse bucket shown in Figure 6 illustrated in the manner of fastening the bucket to the screening member.

Figure 8 is a perspective of one of the baffles employed in the separator illustrated in Figures 4 and 5.

Figure 4:
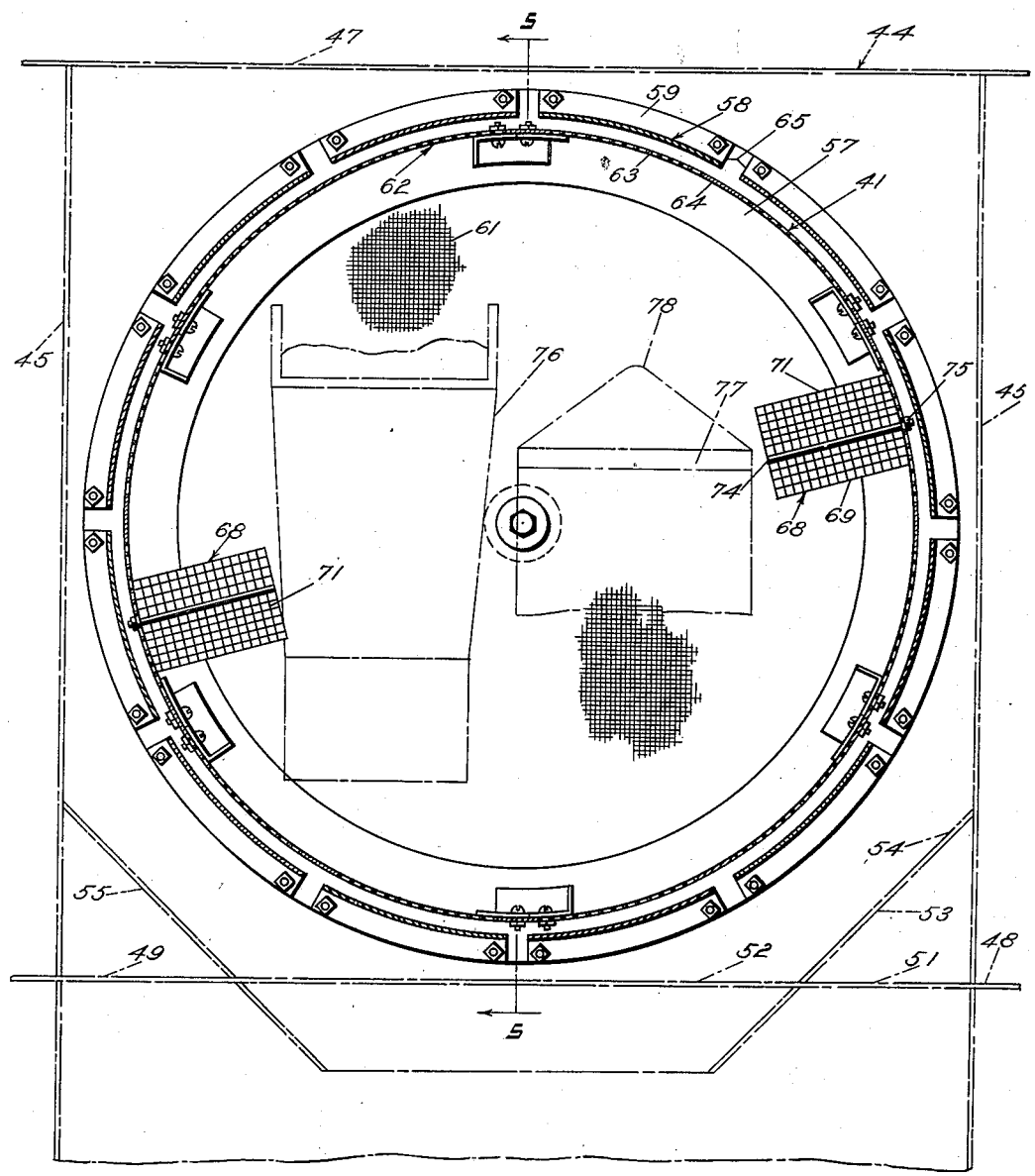
Figure 4 is a side elevation of a further preferred embodiment of the principles of the present invention, looking in the direction of the axis, a portion of the side wall being omitted to show the internal construction.

With reference to the drawings and more specifically to Figures 1 and 2, the apparatus as shown comprises a rotary screen 11 to which the abrasive or similar material to be cleaned or reclaimed is fed by way of a chute 12 which may receive the material from any suitable source, as an elevator (not shown). Screen member 11, as viewed in Figure 1, is preferably driven in a clockwise direction and the chute 12 delivers the material to be treated to the screen at a point near the beginning of the lower 180° arc of rotation of the screen pockets or elements 13, to be described. The screened material is delivered throughout the lower half of the arc of rotation and the larger pieces of debris such as nails, wires, slugs, chips and the like are discharged from the screen elements as they approach the top center into a suitable discharge chute 14.

The rotary screen structure in the preferred embodiment shown in Figures 1 and 2 comprises two annular plates or rings 15 and 16, respectively, of substantially equal inside and outside diameters. These plates or rings are spaced apart in parallel planes and are concentric with the same axis, plate 15 being preferably supported for rotation by a spider 17 consisting of a series of arms radiating from a hub 18 secured to a driving shaft 19 mounted and driven in any suitable manner as by the means disclosed in my copending application.

Annular plates 15 and 16 are in accordance with the preferred construction shown, connected by radially disposed plates 21 which are preferably slightly narrower than the annular plates and secured thereto along their respective end edges 22 by any suitable means. Radial plates 21 are shown as spaced about the circumferential arc of plates 15 and 16 at about 30° apart although it is to be understood that this exact spacing is not essential to the principles of the invention. Between the outer ends of plates 21, plates 15 and 16 are spaced and connected by substantially flat plates 23, likewise secured at their end edges to the flat surfaces of plates 15 and 16 by any suitable means, and preferably located substantially on chords subtending the outer edges of plates 21. The outer adjacent edges of plates 21 and 23 are preferably spaced slightly as shown at 24 for a purpose to be later described.

Each of the radial plates 21 terminates at its inner edge substantially at 25 in the center of a channel like plate or iron 26, which, like plates 21 and 23, extends from plate 15 to plate 16 and is secured thereto, the flanges of channels 26 at 27 being turned outwardly toward the outer peripheries of plates 15 and 16 so that each channel 26 forms a double pocket extending along the entire inner edge of the corresponding radial plate 21, providing a pocket on each side of each plate at its inner edge. Annular plates 15 and 16 are further connected by and serve as supports for corner bars 28, extending from one of said plates to the other and spaced slightly, i. e. about one to two inches from the adjacent edge portions of radial plates 21 and cord plates 23, i. e. the outer edges of plates 21 and the adjacent edges of plates 23 as indicated at 24.

Screen 11 comprises a series of circumferentially spaced screen elements or pockets 13. The screen or screen walls 29, 31 and 32 may be secured at two edges or otherwise connected at two edges to plates 15 and 16, and each of screens 29 and 32 is secured at its inner edge to the corresponding flange 27 of the corresponding channel 26, and at its opposite or outer edge is secured to and supported by the corresponding rod or fillet 28, previously described, through a suitable fastener 30, which forms the corner of screen pocket or element 13 so that the mesh fabric or screen forming each of screen elements 13 may be in one piece or three pieces as is found most convenient and economically desirable.

In operation, the material to be screened is fed by chute 12 into an opening 33 in the center of plate 16. With screen 11 rotating in a clockwise direction as shown in Figure 1, chute 12 delivers at a point near the beginning of the lower 180° arc. As the screen element 13 in front of chute 12 passes downwardly, the material passes over radial screen 29 toward the outer periphery and the fine material which passes through the screen rolls down radial plate 21, being discharged through space 24 between the outer edges of plates 21 and 23, and as the screen continues to rotate, still describing the operation of the same screen member 29, the material which does not pass through screen 29 to be discharged as described, rolls and slides along screen 31 which is parallel to chord plate 23, it being understood that screens 29, 31 and 32 are all preferably spaced a relatively short distance as three-eighths inch to one-half inch from adjacent plates 21 and 23. The material that passes through this screen 31 is then discharged at the next opening 24 to the right, and as rotation of screen 11 continues toward the top of the bottom arc, the material rolls and slides along screen 32, the screenable material passing through the mesh, furnishing three screening operations as applied to all of the material delivered to the screen to be treated which does not pass through the first screen 29 or the second screen 31.

As the screen element or member 13, being discussed, moves into the upper arc, each pocket or channel 26 being at the bottom of its plate 21, catches whatever fine material may have passed through the screen member 32, without being discharged inward radially into chute 14. To avoid loss of any of desired material which may drop into chute, a portion of the chute bottom may be formed of screen as at 34, Figure 2, and an additional chute 35 beneath the screen may be utilized to carry the material back to the rotary screen as illustrated.

If the direction of rotation of the screen be reversed, the position of chutes 12 and 14 must be correspondingly changed.

In summarizing the operation, it will be noted that the material to be treated as, for instance, used abrasive, mixed with refuse and debris from a sand blasting operation or the like, is fed by way of chute 12 to rotary screen 11 having inwardly conveying screen pockets 13 arranged around its circumference, the screen pockets being enclosed by radial plates 21 and chord plates 23 spaced outwardly from the screen or perforate walls 29, 31, and 32 by a distance of preferably three-eighths inch. Such spacing prevents the passage of wire, slugs, nails and the like therethrough and permits their ready discharge upon further rotation of the screen.

As the screen rotates, the material to be screened, delivered to any particular pocket 13, passes along the screen surfaces 29, 31 and 32 in turn, the material which passes through the screens being discharged at circumferential openings 24. The larger debris, as nails, wire, chips, etc. is retained by screens 29, 31 and 32 and deposited in discharge chute 14 which leads outwardly and downwardly from center opening 33 as the screen pockets or sections 13 approach top center. The passage of the nails and wire through the screen is prevented by plates 21 and 23, and at the corners their escape through openings 24 is prevented by members 28 which close the corresponding areas at the corners in addition to supporting the screen.

A further preferred modification of my invention is shown in Figures 4 and 5 wherein a rotary screening element 41 is mounted on spider 42 fixed to a shaft 43 in a housing 44. While housing 44 is shown only in connection with the modification of Figures 4 and 5, it is to be understood that it is also preferably employed with the embodiment of the invention as shown in Figures 1 and 2. Housing 44 is preferably formed with sides 45, ends 46, a cover 47 and a base 48 secured together by any suitable means. Base 48 is formed in two sections 49 and 51 which define an aperture 52 into which a chute 53, formed by plates 54 and 55, extends to deliver the screened material to an air washing apparatus as of the type disclosed in my copending application or any other suitable apparatus.

Screen 41 preferably comprises spaced and parallel annular or ring-like plates 56 and 57, secured to one another in fixed relation by a series of circumferentially spaced arcuate plates 58 provided with side flanges 59, preferably bolted or otherwise secured to plates 56 and 57. Plate 57 is secured to the arms of spider 42 by any suitable method of fastening and is provided with a mesh screen over its inner opening at 61.

A screening element or member 62 is secured to both plates 56 and 57 in concentric relation to plates 58 and spaced a relatively short distance therefrom as from one to two inches. Element 62 is preferably formed with a series of alternately arranged perforate and imperforate portions as shown at 63 and 64 respectively, the respective sizes and positioning thereof being such that perforate portions 63 are disposed opposite plates 58 and the center of imperforate portions 64 are disposed opposite spaces 65 between plates 58, portions 64, however, being of a greater width than spaces 65 and overlapping portions of the oppositely disposed plates 58.

As shown in Figure 5, the screen 41 may be roughly divided into a left hand section designated generally by the arrow A and a right hand section designated generally by the arrow B. In section A, imperforate sections 64 are provided with a series of staggered and angularly disposed baffles or guides 66 which are preferably secured to screen 41 by bolts 67 or other suitable fastening means.

Section B is preferably formed with a series of refuse buckets on screening elements 68 secured to selected perforate portions 63, and slightly spaced from ring 57. While only two of such buckets have been shown, it is to be understood that any desired number thereof may be employed. Buckets 68 comprise a shelf portion 69 and sides 71 and 72, all preferably normal to the inner surface of screen 41 and formed of screen mesh of suitable size. Side 71 is preferably formed in one place while side 72 is formed with an inclined shelf at 73, its outer edges extending to ring 57. Buckets 68 are preferably secured to screen 41 by bolts or rods 74 preferably welded to sides 71 and 72 and secured in perforations in a section 63 by a nut 75 or like means.

A chute 76, discharging adjacent the lower portion of screen 41 is provided for the entrance of material to be treated, the screened material being discharged through chute 53. Debris such as nails, slugs, wires and the like is discharged through a chute 77, preferably formed with a hood 78 thereon. If desired, chute 77 may be formed with a screen section in the same manner as the discharge chute illustrated in Figure 2.

In operation, the material to be treated is introduced through chute 76 and discharged into the bottom of screen 41 which is rotated in a counter-clockwise direction as viewed in Figure 4. It will be noted that chute 76 is designed to discharge into section A of screen 41 wherein the material is agitated by baffles 66, the major portion thereof passing through the screen to chute 53. By reason of the angular disposition of baffles 66 to the plane of rotation of screen 41 and their displacement relative to one another, the remaining material is caused to move to section B of the screen wherein it is subjetced to further agitation and screening through perforate sections 63, the larger particles being picked up by buckets 68. The mesh of buckets 68 is such that desired particles are screened therethrough but slugs of relatively large size, wire, nails and the like are retained therein. Upon the revolution of a bucket 68 to a point slightly higher than that shown for the right bucket in Figure 4, the accumulated debris and refuse therein is discharged through the open end of the bucket into chute 77 and removed from the apparatus. Hood 78 is preferably provided to insure that no debris is returned to the screen.

It will be noted that by the novel arrangement of perforate sections 63, imperforate sections 64 and arcuate plates 58, no nails, wire, slugs or like material can pass therethrough since plates 58 effectively halt any such material attempting to pass sections 63 and sections 64 prevent such material from passing between spaces 65. Yet the flow of screened material is unhampered since it may pass through sections 63, and along plates 58 to openings 65 to chute 53.

It will be seen that the present invention not only provides an apparatus that is essentially cheap and simple in construction but which is also highly efficient and in which the refuse and debris is removed immediately after collection whereby it is not mixed with newly-entering material and such material need not be screened therethrough.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a separating and cleaning device, a circular screening member arranged for rotation, a series of screening elements secured thereto adjacent one side thereof and extending radially inwardly toward the axis of rotation of said screening member, means to discharge material to be screened upon the opposite side of said screening member, a series of baffles thereon arranged to direct the material to said screening elements upon rotation of said screening member, and means to receive material from said screening elements, said elements being provided with open ends to discharge material into said means at a predetermined position of said screening member.

2. In a separating and cleaning device, a circular screening member arranged for rotation, a series of screening elements secured thereto closely adjacent one side thereof and extending radially inwardly toward the axis of rotation of said screening member, each of said elements comprising a perforate bottom portion and perforate side portions, one of the latter extending substantially at a right angle to said screening member, the other inclining toward and in contact with the adjacent side thereof, means to discharge material to be screened adjacent the opposite side of said screening member, a series of staggered baffles secured to said screening member to direct the material to said screening elements upon rotation of said screening member, and means to receive material from said screening elements, the screening elements being provided with open ends to discharge material into said means at a predetermined position of said screening member.

3. In a separating and cleaning device, a circular screening member comprising a series of alternately arranged perforate and imperforate sections, a series of screening elements secured to selected perforate portions adjacent one side thereof and extending radially inwardly toward the axis of rotation of said screening member, means to discharge material to be screened adjacent the opposite side of said screening member, a series of baffles secured to said imperforate portions adjacent said discharge means to direct material to said screening elements upon rotation of said screening member, and means to receive refuse from said elements, said means being provided with means to prevent the discharge of refuse into other portions of said screening member.

4. The combination in a separating and cleaning device of a circular rotary screen having screen pockets arranged around its periphery, said pockets having openings therein whereby material discharged from one pocket in the course of rotation of said screen may fall in another of said pockets, the screen pockets having substantially radial and circumferential walls of foraminous material and imperforate walls parallel to and spaced slightly outward from the foraminous walls, said imperforate walls being arranged to provide spaces at the circumference of the screen adjacent said radial walls for the discharge of the screened material, means for feeding the material to be treated to the screen and means for discharging the nails, wire and other larger debris separated by the screen.

5. The combination in a separating and cleaning device of a circular rotary screen having screen pockets arranged around its periphery, the screen pockets having substantially radial and circumferential walls of foraminous material and imperforate walls underlying and spaced slightly from the foraminous walls, said imperforate walls being arranged to provide spaces at the circumference of the screen for the discharge of the screened material, means for feeding the material to be treated to the screen and means for discharging the nails, wire and other larger debris separated by the screen, the imperforate walls preventing the passage of nails, wire and the like with the screened material through the screens and the screen having imperforate members adjacent said openings for preventing the escape of nails, wires, etc. at these points.

6. A rotary screen for separating debris from abrasive, the same comprising an annular support, screen pockets arranged around said support, means for feeding the abrasive to the center of said screen, and means for discharging the debris from the center of the screen, substantially radial plates spaced around said support, other plates arranged along the circumference between the outer ends of said radial plates, the ends of the radial plates and the circumferential plates being spaced apart, providing discharge openings at the circumference, foraminous material overlying and spaced from said plates forming screen pockets between said plates, and outwardly disposed pockets covering the inner edges of said plates to prevent the discharge of the screened material toward the center.

7. A rotary screen for separating debris from abrasive, the same comprising an annular support, screen pockets arranged around said support, means for feeding abrasive to the center of said screen, means for discharging the debris from the center of the screen, and imperforate plates surrounding said pockets and having discharge openings at the circumference, foraminous material overlying and spaced from said plates forming said screen pockets.

8. A rotary screen for separating debris from abrasive, the same comprising an annular support, screen pockets arranged around said support, means for feeding the abrasive to the center of said screen, and means for discharging the debris from the center of the screen, imperforate plates surrounding said pockets and having discharge openings at the circumference, foraminous material overlying and spaced from said plates forming said screen pockets, and outwardly disposed pockets covering the inner edges of said plates to prevent the discharge of the screened material toward the center.

9. A rotary screen for separating debris from abrasive, the same comprising an annular support, screen pockets arranged around said support, means for feeding the abrasive to the center of said screen, and means for discharging the debris from the center of the screen, imperforate plates enclosing said screen pockets and providing discharge openings at the circumference, foraminous material forming the screen pockets and overlying and spaced from said plates, outwardly disposed pockets covering the inner edges of said plates and preventing the discharge of the screened material toward the center, said discharge means for the debris being located near the top center and said feeding means being located near the beginning of the bottom 180 degree arc of rotation.

10. A rotary screen for treating abrasive and separating the larger debris therefrom comprising an annular plate and a circular plate, imperforate radial plates spaced along the circumferential length of said supporting plates, other imperforate plates extending in the direction of the circumference between the outer ends of said radial plates and substantially parallel to the axis, the plates being arranged to form discharge openings adjacent the ends of the radial plates, foraminous material forming screen pockets between said radial plates and circumferential plates, said foraminous material being spaced slightly inward from said plates, means closing the screens opposite the discharge openings and pockets at the inner ends of the radial plates to prevent the discharge of the screened material toward the center, a chute for feeding the material to be treated through the opening in the annular frame member at the beginning of the lower 180 degree arc of rotation, and means just ahead of the top center leading from the opening in the annular frame for discharging the debris.

ROBERT B. HUYETT.